(12) United States Patent
Ammireddy

(10) Patent No.: US 9,705,782 B2
(45) Date of Patent: Jul. 11, 2017

(54) METHOD AND SYSTEM FOR EFFICIENT GRACEFUL RESTART IN AN OPEN SHORTEST PATH FIRST (OSPF) NETWORK

(71) Applicant: TELEFONAKTIEBOLAGET L M ERICSSON (PUBL), Stockholm (SE)

(72) Inventor: Amarnath Ammireddy, Santa Clara, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 652 days.

(21) Appl. No.: 13/717,592

(22) Filed: Dec. 17, 2012

(65) Prior Publication Data
US 2014/0173133 A1    Jun. 19, 2014

(51) Int. Cl.
*G06F 15/173*   (2006.01)
*H04L 12/721*   (2013.01)
*H04L 12/751*   (2013.01)
*H04L 12/715*   (2013.01)

(52) U.S. Cl.
CPC .............. *H04L 45/12* (2013.01); *H04L 45/02* (2013.01); *H04L 45/04* (2013.01)

(58) Field of Classification Search
CPC ..... H04L 45/02; H04L 41/0654; H04L 41/12; H04L 45/00; H04L 45/021; H04L 45/026; H04L 45/04; H04L 45/12; H04L 45/28; H04L 67/10; H04L 67/1095; H04L 67/1097; H04L 7/10
See application file for complete search history.

(56) References Cited

U.S. PATENT DOCUMENTS

| | | | |
|---|---|---|---|
| 7,515,600 B1 * | 4/2009 | Savage | H04L 45/02 370/426 |
| 2009/0086622 A1 * | 4/2009 | Ng | H04L 45/02 370/219 |
| 2010/0278071 A1 * | 11/2010 | Hattori | H04L 41/12 370/254 |

(Continued)

OTHER PUBLICATIONS

International Search Report, Application No. PCT/IB2013/059956, Jan. 30, 2014, 12 pages.

(Continued)

*Primary Examiner* — Christopher Biagini
(74) *Attorney, Agent, or Firm* — Nicholson De Vos Webster & Elliott LLP

(57) ABSTRACT

A method to enhance a graceful restart process in an open shortest path first (OSPF) network is disclosed. The method is implemented on an OSPF enabled router that is adjacent to a plurality of neighboring OSPF enabled routers within a network, where the OSPF enabled router and the plurality of neighboring OSPF enabled routers are within one area of the network. In preparation of a database synchronization process during a graceful restart (GR) session, the OSPF enabled router selects a first neighboring OSPF enabled router from the plurality of neighboring OSPF enabled routers, initiates a first database synchronization with the first neighboring OSPF enabled router. Then the OSPF enabled router initiates a set of database synchronizations with remaining neighboring OSPF enabled routers only after the first database synchronization with the first neighboring OSPF enabled router completes.

18 Claims, 8 Drawing Sheets

(56) References Cited

U.S. PATENT DOCUMENTS

2012/0275456 A1    11/2012    Ammireddy

OTHER PUBLICATIONS

Holla, Ashok C., et al., "Update to OSPF Graceful Restart procedure draft-holla-ospf-update-graceful-restart-02.txt", Sep. 2006, 14 pages.
Pillay-Esnault, P., et al., "OSPFv3 Graceful Restart", RFC 5187, Jun. 2008, 14 pages.
Sangli, S., et al., "Graceful Restart Mechanism for BGP", RFC 4724, Jan. 2007, 30 pages.
J. Moy, "OSPF Version 2," Apr. 1998, 244 pages, Network Working Group, Request for Comments 2328, The Internet Society.
J. Moy et al., "Graceful OSPF Restart," Nov. 2003, 18 pages, Network Working Group, Request for Comments 3623, The Internet Society.
L. Nguyen et al., "OSPF Restart Signaling," Mar. 2007, 7 pages, Network Working Group, Request for Comments 4812, The IETF Trust.

* cited by examiner

METHOD AND SYSTEM FOR EFFICIENT GRACEFUL RESTART IN AN OPEN SHORTEST PATH FIRST (OSPF) NETWORK

FIELD

The embodiments of the invention are related to the field of routing in a data network. More specifically, the embodiments of the invention relate to routing in an open shortest path first (OSPF) network.

BACKGROUND

Many routers implement a separation of control and forwarding functions. Certain processors of these routers are dedicated to control and management task (and perform functions in so called "control plane" of these routers), while other processors of these routers are dedicated to data forwarding tasks (and perform functions in so called "data plane"). This separation creates the possibility of maintaining a router's data plane functionality of data forwarding when the control plane is restarted (e.g., during a control software upgrade), thus restarting the control plane does not impact data forwarding of the data plane. Such mechanism is generally called "graceful restart" or "non-stop forwarding." In a network supporting open shortest path first (OSPF) protocol, an OSPF enabled router can stay on the data forwarding path thus keeps an active data plane while its routing software is restarted through a graceful restart process.

During a graceful restart process of an OSPF network, when the network topology remains stable, the restarting router is kept on the forwarding tables of its neighboring routers. When a restarting OSPF enabled router restarts its routing software, its database may be empty or significantly different from its neighboring routers, thus the data synchronization of the restarting OSPF enabled router with its neighboring routers may take significant time. In a scaled environment, where the restarting OSPF router needs to synchronize its database with many neighboring routers, the data synchronization process can be lengthy and resource consuming.

SUMMARY

A method to enhance the efficiency of a graceful restart (GR) process in an Open Shortest Path First (OSPF) network. The method is implemented in an OSPF enabled router that is adjacent to multiple neighboring OSPF enabled routers within the OSPF network, and all routers support an implementation of GR protocol. In preparation of a database synchronization process during a GR session of the OSPF enabled router, for a given area, a first neighboring OSPF enabled router is selected from the multiple neighboring OSPF enabled routers. A database synchronization is initiated between the OSPF enabled router and the first neighboring OSPF enabled router. Then database synchronizations between the OSPF enabled router and the remaining neighboring OSPF enabled routers are initiated only after the database synchronization between the OSPF enabled router and the first neighboring OSPF enabled router completes.

A network element serving as an OSPF router. The network element is adjacent to a number of neighboring OSPF enabled routers within a network, and the network element and the neighboring OSPF enabled routers support GR protocol. The network element contains a helper selector configured to select a first neighboring OSPF enabled router from the number of neighboring OSPF enabled routers in preparation of a database synchronization. The network element also contains a database synchronizer configured to initiate a database synchronization process with the first neighboring OSPF enabled router and the database synchronizer is further configured to initiate database synchronizations with the remaining neighboring OSPF enabled routers only after the first database synchronization with the first neighboring OSPF enabled router completes.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
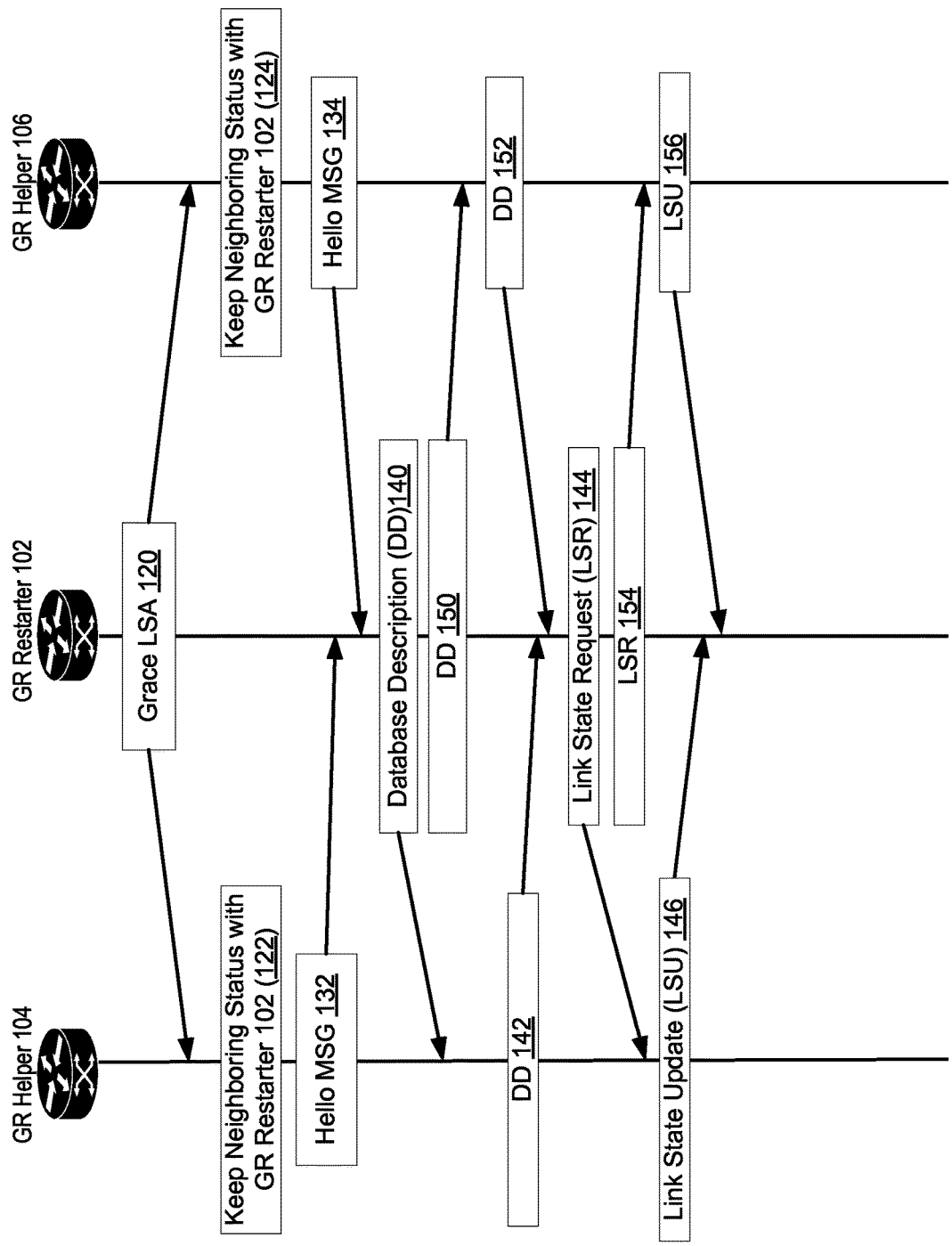
FIG. 1 is a block diagram illustrating a graceful restart (GR) process known to persons skilled in the art.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagram will be described with reference to the exemplary embodiment of FIG. 8. However, it should be understood that the operations of flow diagrams can be performed by embodiments of the invention other than those discussed with reference to FIGS. 3, 4, and 7, and the embodiments discussed with reference to FIG. 8 can perform operations different than those discussed with reference to the flow diagrams of FIGS. 3, 4, and 7.

Different embodiments of the invention may be implemented using different combinations of software, firmware, and/or hardware. Thus, the techniques shown in the figures can be implemented using code and data stored and executed on one or more electronic devices (e.g., an end system, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

OSPF protocol operates in a network with many routers, and the network may be referred to as an autonomous system (AS). OSPF protocol allows sets of routers in a network to be grouped together. Such a grouping is called an area. The topology of an area is hidden from the rest of the AS and the information hiding enables a significant reduction in routing traffic. Also, routing within an area is determined only by the area's own topology, thus bad routing data outside of the area will not hinder routing efficiency within the area. A network may have a single area or a number of areas.

FIG. 1 is a block diagram illustrating a graceful restart (GR) process known to persons skilled in the art. GR restarter 102 prepares to start a GR process and it communicates with two neighboring routers GR helper 104 and GR helper 106. GR helpers 104 and 106 represent neighboring routers of GR restarter 102, even though GR restarter 102 may have many more neighboring routers. For this example, assume GR restarter 102, GR helper 104, and GR helper 106 are within a single area. Each neighboring router connects to GR restarter 102 on a network segment. GR restarter 102 may enter a GR process through a network operator issuing a command, or it may enter a GR process due to an unplanned outage of itself. At the start of a GR process, GR restarter 102 initiates a special link state advertisement (LSA) message, commonly referred to as a grace-LSA message to its neighboring routers. Grace-LSA message at reference 120 is sent to both GR helper 104 and GR helper 106. Note when GR restarter 102 contains multiple OSPF interfaces, grace-LSA messages may be sent to all its OSPF interfaces. GR restart 102 may retransmit the grace-LSA messages until they are acknowledged. Note GR restarter 102, GR helper 104, GR helper 106 and all neighboring routers of GR restarter 102 are OSPF enabled routers. In this specification, the terms "OSPF enabled router" and "OSPF router" are used interchangeably.

Once grace-LSA message is received at GR helper 104, it may enter a helper mode with GR restarter 102. After entering the helper mode, GR helper 104 keeps neighboring relationship with GR restarter intact at reference 122, even though GR restarter 102 is being reinitiated on its control plane and cannot route traffic. GR helper 104 may send out a "Hello" message to GR restarter 102 at reference 132 indicating that GR helper 104 is ready to reestablish a neighboring relationship with GR restarter 102. Similarly, GR helper 106 goes through a process of keeping neighboring state with GR restarter 102 at reference 124 and sending out a "Hello" message at reference 134. The two "Hello" messages from GR helpers 104 and 106 do not arrive at GR restarter 102 at the same time due to different propagation delays, and it is assumed the "Hello" message from GR helper 104 arrives first for illustration purpose.

Once GR restarter 102 receives the "Hello" message from GR helper 104, it runs customary validity check. Then GR restarter 102 sends out a database description (DD) packet at reference 140. The sending of DD packet is a part of a synchronization process between GR restarter 102 and GR helper 104. The DD packet at reference 140 may be the first of a sequence of DD packet sent from GR restarter 102 to GR helper 104. The DD packet contains a summary of the link state information contained in the database of GR restarter 102. Since GR restarter 102 is restarting its control plane, likely it contains no link state information. However, when GR restarter 102 enters the GR session due to an unplanned outage, it may contain some link state information in its database.

After GR helper 104 receives the DD packet, it determines whether to accept the DD packet, or ignore/reject the DD packet when the DD packet is a duplicate, the neighbor state is invalid, or the DD packet is in some other abnormal condition. Once the DD packet is accepted, the summary of the link state information within the DD packet is examined. GR helper 104 checks the included summary and see if there is any LSA that is more recent than its own database copy. If there is, GR Helper 104 makes a note that the newer LSA should be requested later. Since the DD packet at reference 140 likely contains no link state information (when GR restarter 102 restarted by an operator command) or stale link state information (when GR restarter 102 restarted through an unplanned outage), GR helper 104 may not need to get more recent LSA than what it already contains. The return DD packet of GR helper 104 to GR restarter 102 at reference 142 may include a summary of the link state information at GR helper 104.

When a single DD packet is insufficient to provide a summary of link state, multiple pairs of DD packets (not shown) can be sent between GR restarter 102 and GR helper 104. The sending and receiving of DD packet during the GR process is also referred to as a "database exchange process."

During the database exchange process, GR restarter 102 and GR helper 104 may form a master/slave relationship. The master may retransmit DD packets at a fixed predetermined interval and the multiple pairs of DD packets are marked by sequence numbers so that the database exchange process may continue even if some DD packet is lost in transmission. In one embodiment, a DD packet may be marked with a "M" bit off indicating there is no more DD packet to follow when "Exchange" state is complete. When GR helper 104 determines that it does not need an up-to-date LSA from GR restarter 102, it indicates it is in "Full" state.

After DD packet exchanges, GR restarter 102 sends out a link state request (LSR) packet to GR helper 104 at reference 144. The LSR packet identifies LSA update it needs based on the DD packet exchange(s) GR restarter 102 has performed with GR helper 104. Upon receiving the LSR packet from GR restarter 102, GR helper 104 sends out a link state update (LSU) packet containing up-to-date LSA data to GR restarter 102 at reference 146. The LSR and LSU packets can and often be sent in sequence (not shown), when one pair of LSR and LSU packet is insufficient to exchange needed LSA data. The database exchange process completes when the link state databases of GR restarter 102 and GR helper 104 are fully synchronized.

While GR restarter 102 and GR helper 104 are a database exchange process, GR restarter 102 engages in a similar process with GR helper 106. As discussed earlier, GR helper 106 sends out a "Hello" message at reference 134. After GR restarter 102 receives the "Hello" message, it sends out a DD packet at reference 150, similar to the DD packet it sends out to GR helper 104. GR helper 106 receives the DD packet and sends out a summary of its link state with DD packet at reference 152. Similar to DD packet pair DD 140 and DD 142 between GR restarter 102 and GR helper 104, the DD packet pair DD 150 and DD 152 between GR restarter 102 and GR helper 106 may be followed by other DD packets between the two routers until the full summary of link states are exchanged. Afterward, a LSR packet at reference 154 is sent from GR restarter 102 to GR helper 106 to request up-to-date LSA data. In return, a LSU packet at reference 156 is sent from GR helper 106 to GR restart with up-to-date LSA data. A sequence of LSR and LSU packet exchange may follow the LSR at reference 154 and LSU at reference 156 to fully synchronize link state information between the two parties.

Note that GR process discussion above applies to different network topologies. The underlying network can be point-to-point between a GR restarter and a GR helper, point-to-multipoint between a GR restarter and multiple GR helpers, or virtual links between a GR restarter and multiple GR helpers. Similarly, the GR restarter and GR helpers may be a designated router, which is a router interface of a router selected among all routers on a particular network segment, or a backup designated router, which is a router becoming the designated router if the current designated router has a problem or fails.

With this example, similar database synchronization processes occurs between GR restarter 102 and GR helps 104/106. Yet, all OSPF neighbors should contain the same database of link state when the network is in a stable state. While the database synchronization process may be straightforward to implement, in a scaled environment where a GR restart contains many neighboring routers that function as GR helpers, the flooding of DD packet exchange and LSR/LSU packet exchange slows down network synchronization convergence during a graceful restart and it may needlessly consume large amount of network resource. In one experiment, with a setup with a router with 300 OSPF neighbors in a single area, GR process does not complete link state synchronization until after 5+ minutes.

Figure 2:
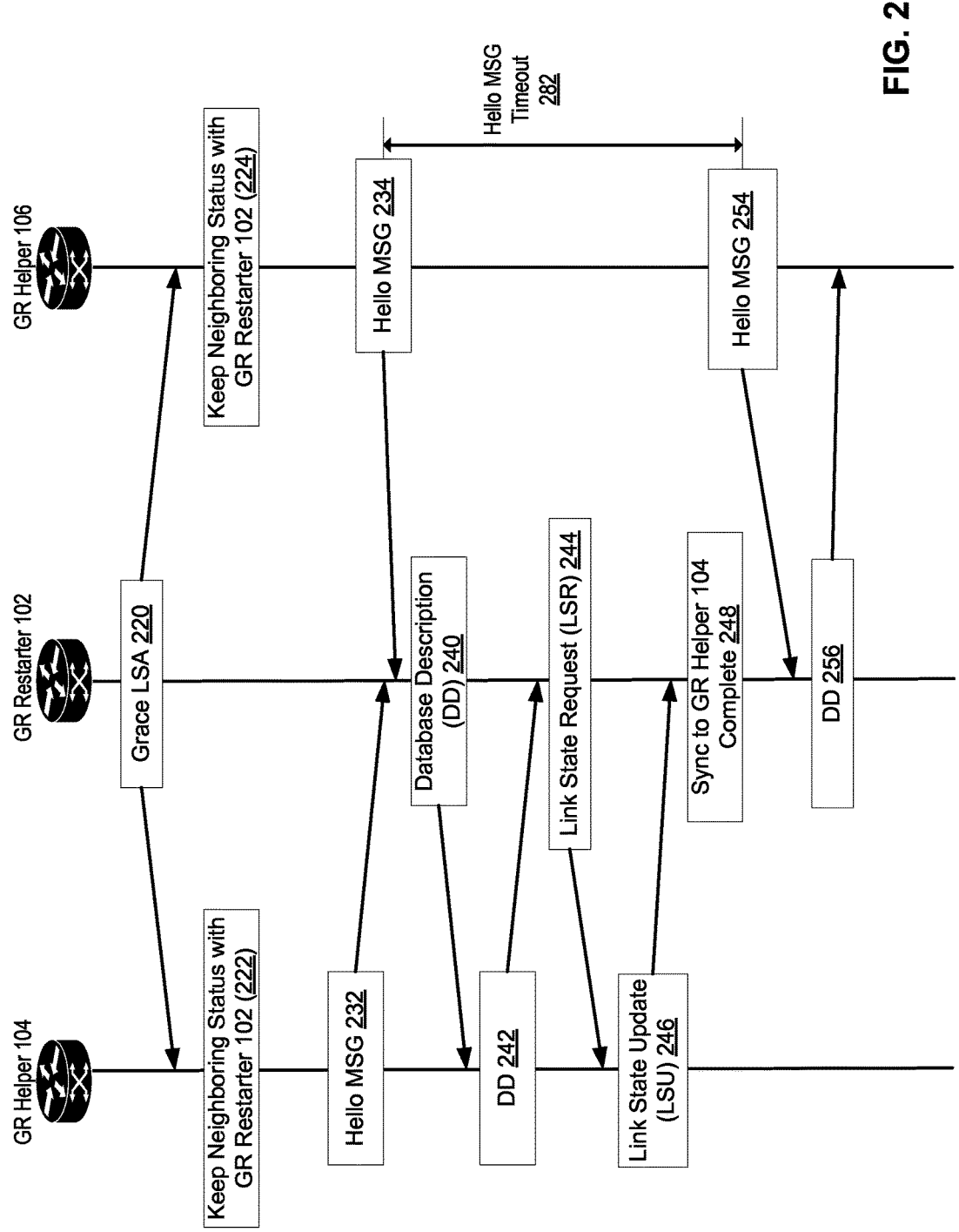
FIG. 2 is a block diagram illustrating an enhanced GR process according to one embodiment of the invention.

FIG. 2 is a block diagram illustrating an enhanced graceful restart (GR) process according to one embodiment of the invention. Routers in FIG. 2 are similar to routers in FIG. 1 and the same or similar references indicate elements or components having the same or similar functionalities. GR restarter 102 prepares to start a GR process and it communicates with two neighboring routers GR helper 104 and GR helper 106. GR helpers 104 and 106 represent neighboring routers of GR restarter 102, even though GR restarter 102 may have many more neighboring routers. Each neighboring router connects to GR restarter 102 on a network segment. GR restarter 102 may enter a GR process through a network operator issuing a command, or it may enter a GR process due to an unplanned outage of itself. GR restarter 102 initiates a special link state advertisement (LSA) message, commonly referred to as a grace-LSA message to its neighboring routers. Grace-LSA message at reference 220 is sent to both GR helper 104 and GR helper 106. Note when GR restarter 102 contains multiple OSPF interfaces, grace-LSA messages may be sent to all its OSPF interfaces. GR restart 102 may retransmit the grace-LSA messages until they are acknowledged.

Once grace-LSA message of reference 220 is received at GR helper 104, GR helper 104 may enter a helper mode with GR restarter 102. After entering the helper mode, GR helper 104 keeps neighboring relationship with GR restarter intact at reference 222, even though GR restarter 102 is being reinitiated on its control plane and cannot route traffic. GR helper 104 may send out a "Hello" message to GR restarter 102 at reference 232 indicating that GR helper 104 is ready to reestablish a neighboring relationship with GR restarter 102. Similarly, GR helper 106 goes through a process of keeping neighboring state with GR restarter 102 at reference 224 and sending out a "Hello" message at reference 234. The two "Hello" messages from GR helpers 104 and 106 do not arrive at GR restarter 102 at the same time due to different propagation delays, and it is assumed the "Hello" message from GR helper 104 arrives first for illustration purpose.

In contrast with FIG. 1, where GR restarter 102 starts database exchange process with multiple GR helpers concurrently upon GR restarter 102 receiving "Hello" messages from these GR helpers, GR restarter 102 selects one GR helper per area (in this case, since there is a single area, only one GR helper will be selected) to start a database exchange process first. In one embodiment of the invention, GR restarter 102 selects the GR helper whose "Hello" message is received first at GR restarter 102 to initiate a database exchange process. In another embodiment, GR restarter 102 may select a GR helper for the database exchange process using a different criterion. For example but not limiting, GR restarter 102 may select a GR helper whose "Hello" message is received in a predetermined period and whose router ID (router ID is a unique identity of a router in an OSPF network as known to persons skilled in the art) is the lowest or the highest number. In the example of FIG. 2, GR restarter 102 selects GR helper 104 to initiate a database exchange process first.

Once GR restarter 102 determines to initiate a database exchange process with GR helper 104, it runs customary validity check. Then GR restarter 102 sends out a database description (DD) packet at reference 240. The sending of DD packet is a part of a synchronization process between GR restarter 102 and GR helper 104. The DD packet at reference 240 may be the first of a sequence of DD packet sent from GR restarter 102 to GR helper 104. The DD packet contains a summary of the link state information contained in the database of GR restarter 102. Since GR restarter 102 is restarting its control plane, likely it contains no link state information. However, when GR restarter 102 enters the GR session due to an unplanned outage, it may contain some link state information in its database.

After GR helper 104 receives the DD packet, it determines whether to accept the DD packet, or ignore/reject the DD packet when the DD packet is a duplicate, the neighbor state is invalid, or the DD packet is in some other abnormal condition. Once the DD packet is accepted, the summary of the link state information within the DD packet is examined. GR helper 104 checks the included summary and see if there is any LSA that is more recent than its own database copy. If there is, GR Helper 104 makes a note that the newer LSA should be requested later. Since the DD packet at reference 240 likely contains no link state information (when GR restarter 102 restarted by an operator command) or stale link state information (when GR restarter 102 restarted through an unplanned outage), GR helper 104 may not need to get more recent LSA than what it already contains. The return DD packet of GR helper 104 to GR restarter 102 at reference 242 may include a summary of the link state information at GR helper 104.

When a single DD packet is insufficient to provide a summary of link state, multiple pairs of DD packets (not shown) can be sent between GR restarter 102 and GR helper 104. During the database exchange process, GR restarter 102 and GR helper 104 may form a master/slave relationship. The master may retransmit DD packets at a fixed predetermined interval and the multiple pairs of DD packets are marked by sequence numbers so that the database exchange process may continue even if some DD packet is lost in transmission. In one embodiment, a DD packet may be marked with a "M" bit off indicating there is no more DD packet to follow when "Exchange" state is complete. When GR helper 104 determines that it does not need an up-to-date LSA from GR restarter 102, it indicates it is in "Full" state.

After DD packet exchanges, GR restarter 102 sends out a link state request (LSR) packet to GR helper 104 at reference 244. The LSR packet identifies LSA update GR restarter 102 needed based on the DD packet exchange GR restarter 102 has performed with GR helper 104. Upon receiving the LSR packet from GR restarter 102, GR helper 104 sends out a link state update (LSU) packet containing up-to-date LSA data to GR restarter 102 at reference 246. The LSR and LSU packets can and often be sent in sequence (not shown), when one pair of LSR and LSU packet is insufficient to exchange needed LSA data exchange. The database exchange process completes when the link state databases of GR restarter 102 and GR helper 104 are fully synchronized at reference 248.

Once GR restarter 102 completes the database synchronization with GR helper 104, it start monitoring incoming "Hello" message from other GR helpers. Note that GR restarter 102 may ignore or drop incoming "Hello" messages from other GR helpers during its database synchronization process with GR helper 104. GR helpers send out "Hello" messages in a fixed timeout interval, and GR restarter 102 starts a database synchronization process with a GR helper once a "Hello" message from a helper is received at GR restarter 102. After receiving the "Hello" message from GR helper 106, which is sent out at reference 254, GR restarter 102 sends out a DD packet containing the summary of link state information it has recently acquired from the synchronization with GR helper 104. Since GR helpers 104 and 106 should contain the same link state since they are in the same area, the DD packet sent out at reference 256 should contain the up-to-date LSA information. In that case, no DD packet from GR helper 106 is needed, and no further LSR and LSU packet exchange is required. Since both neighboring routers (GR helpers 104 and 106) have completed database synchronization with GR restarter 102. The GR process thus completes successfully.

In the embodiment of an enhanced graceful restart process illustrated in FIG. 2, GR restarter 102 completes database exchange with one neighboring router (GR helper 104) first, where it gets up-to-date link state information. In the following database exchanges with other neighboring routers, because all neighboring routers are supposed to have the same link state information, the volume of packet exchanges should at least be greatly reduced. In some embodiments, the following database exchanges with other neighboring routers do not incur any LSU or LSR packet from the other neighboring routers. The difference between a GR process known in the art and embodiments of an enhanced GR process of this invention grows bigger as the number of neighboring routers increases. The reason is intuitive. In a GR process known in the art, the more neighboring routers a GR restarter has to synchronize to, the more packets will be exchanged concurrently between the GR restarter and its neighboring routers. There shall be a lot of flooding overhead as well. In contrast, embodiments of an enhanced graceful process completes database exchange with one neighboring router first, and the following database exchanges take much less packets as the GR restarter already contains the up-to-date database of the selected neighboring router before the following database exchanges start and the flooding overhead can be reduced greatly. The saving of convergence time and packet process resource can be significant, In one experiment, using an embodiment of an enhanced graceful restart process with a setup with a router with 300 OSPF neighbors, the GR process completes link state synchronization within one minute and the packet count for database exchanges reduced by 80%.

Besides the saving of convergence time and packet process resource, the embodiment of an enhanced graceful restart process illustrated in FIG. 2 does not alter the database exchange process known in the art, such as the one illustrated in FIG. 1. The change is only on the sequencing of database synchronization of pairs of GR restarter and GR helpers, thus changes to the method and system supporting a GR process known to the persons skilled in the art can be minor.

Figure 3:
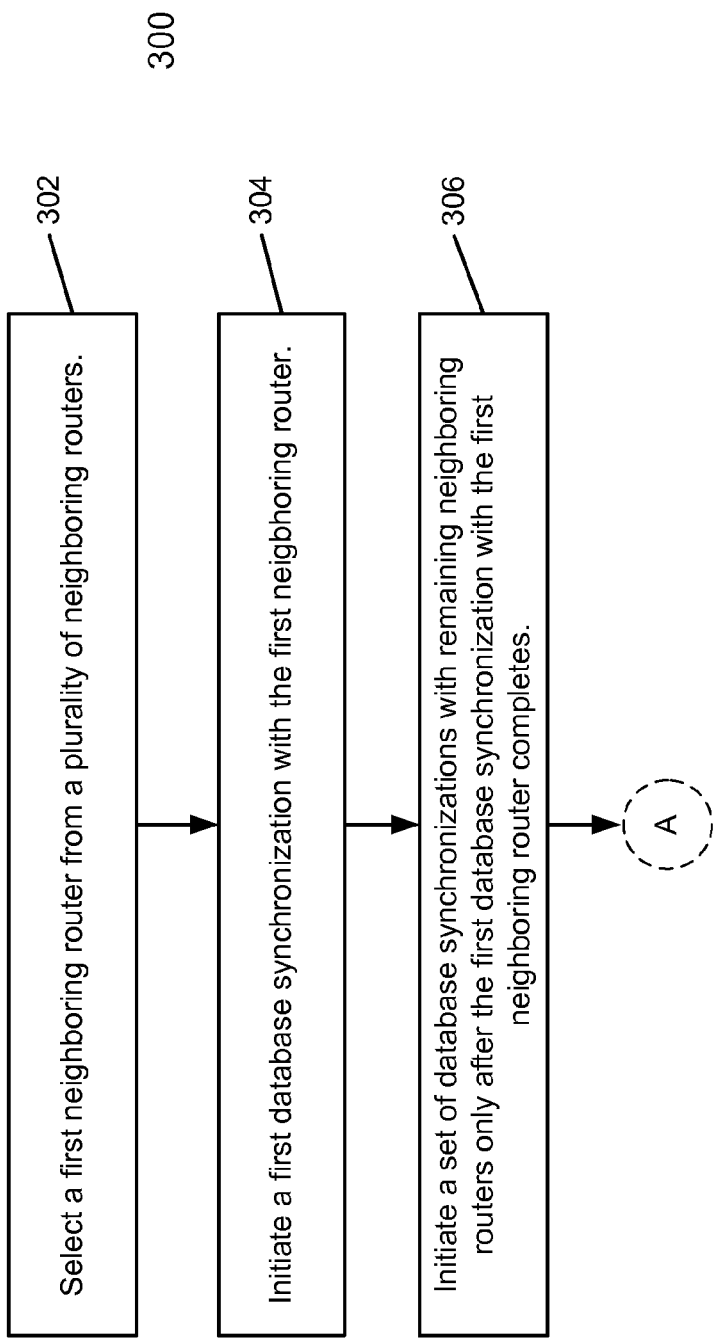
FIG. 3 is a flow diagram illustrating an enhanced GR process according to one embodiment of the invention.

FIG. 3 is a flow diagram illustrating an enhanced graceful restart (GR) process according to one embodiment of the invention. The process can be implemented on an OSPF enabled router such as GR restarter 102 in FIG. 2. The process starts at reference 302, where an OSPF enabled router starts a GR session, and it selects a first neighboring router from a plurality of neighboring routers. The selection may be based on receiving a "Hello" message from the first neighboring router ahead of receiving a "Hello" message from other neighboring routers in one embodiment. After the selection is made, a first database synchronization is initiated between the OSPF enabled router and the first neighboring router at reference 304. The first database synchronization may be performed using a process known in the art such as one discussed in FIG. 2 between GR restarter 102 and GR helper 104. Then a set of database synchronization with remaining neighboring routers are initiated at reference 306 only after the first database synchronization with the first neighboring router completes. Each of the set of database synchronizations may be triggered by the OSPF enabled router receiving a "Hello" message from a GR helper of the remaining neighboring routers. The process may optionally continue to A, which is illustrated in FIG. 4.

Figure 4:
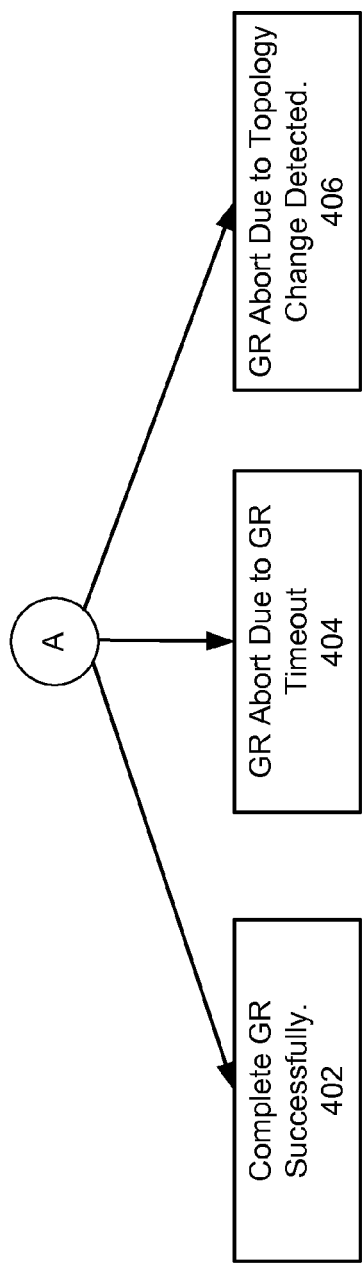
FIG. 4 is a flow diagram illustrating a number of options in completing an enhanced GR process according to one embodiment of the invention.

FIG. 4 is a flow diagram illustrating a number of options in completing an enhanced graceful restart (GR) process according to one embodiment of the invention. After the set of database synchronizations is initiated at the end of FIG. 3, it may complete successfully when all the neighboring routers synchronize with the OSPF enabled router (e.g., GR restarter 102) during the GR session at reference 402. The GR session may abort due to GR session timeout at reference 404. It happens as a GR session may start with a timer, when the database synchronizations with all neighboring routers are not complete and the timer is timed out, the GR session will be aborted. In alternative, the GR session may abort due to topology change at reference 406. Graceful restart operates in a static state and topology should not change during a GR session. When a topology change is detected by either a GR restarter or a GR helper, it may cause the GR session abort. Note the options of GR completion in an embodiment of an enhanced GR process is for illustration only and it is not comprehensive. Also note that the options of GR completion in an embodiment of an enhanced GR process are no different from ones of a GR process known in the art.

Figure 5:
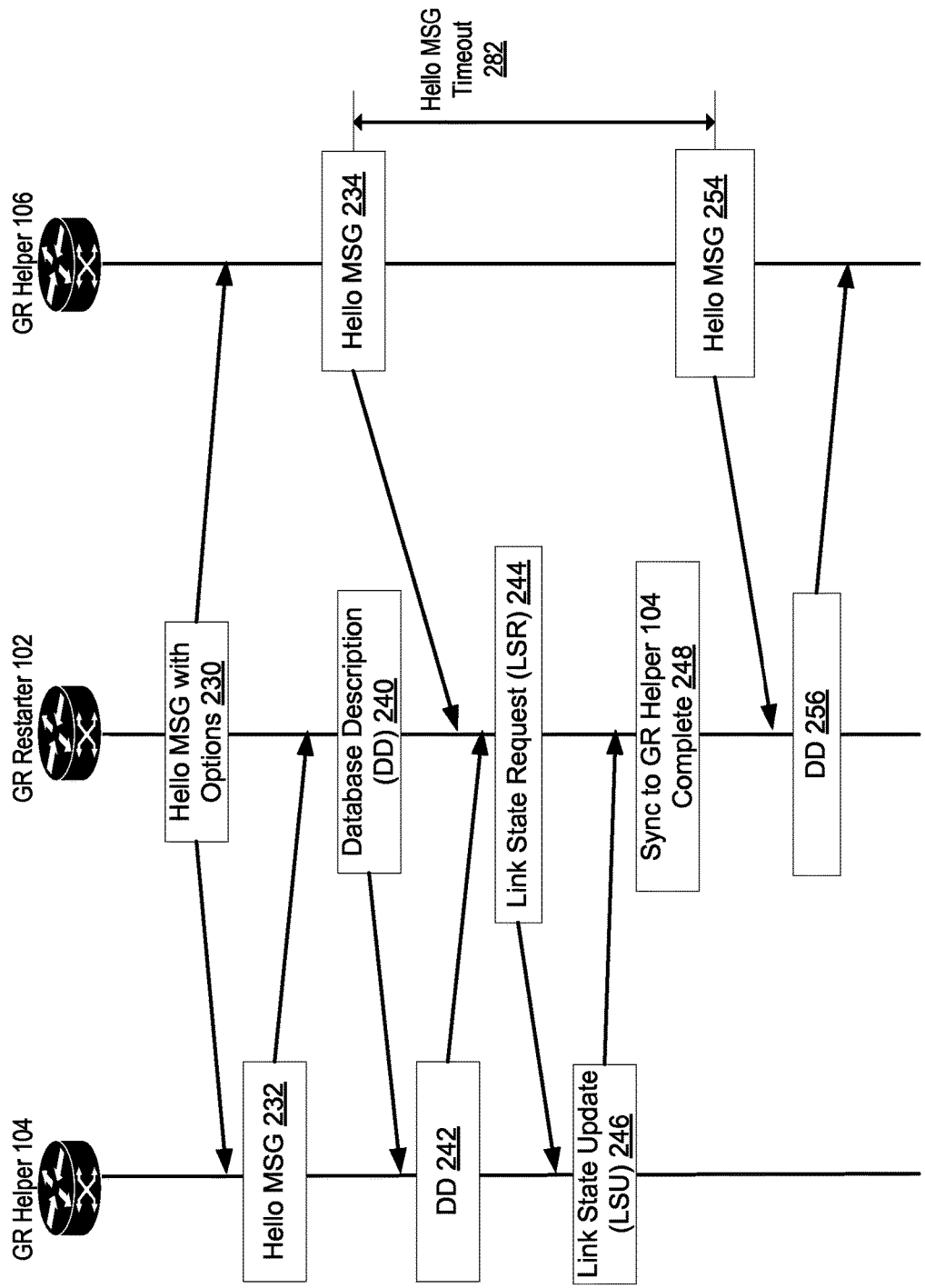
FIG. 5 is a block diagram illustrating another enhanced GR process according to one embodiment of the invention.

FIG. 5 is a block diagram illustrating another enhanced graceful restart (GR) process according to one embodiment of the invention. The enhanced GR process may be performed on routers in compliance with IETF RFC 4812, "OSPF Restarting Signaling." Routers in FIG. 5 are similar to routers in FIG. 2 and the same or similar references indicate elements or components having the same or similar functionalities. GR restarter 102 prepares to start a GR process and it communicates with two neighboring routers GR helper 104 and GR helper 106. GR helpers 104 and 106 represent neighboring routers of GR restarter 102, and GR restarter 102 may have many more neighboring routers. Each neighboring router connects to GR restarter 102 on a network segment. GR restarter 102 may enter a GR process through a network operator issuing a command, or it may enter a GR process due to an unplanned outage. GR restarter 102 initiates a "Hello" message with an option field indicating to start a GR session, instead of a Grace-LSA message as in the embodiment illustrated in FIG. 2. The following database synchronization processes of GR restarter 102 with GR helpers 104 and 106 are the same as illustrated in FIG. 2, thus the same benefit of reducing the duration of GR process and also reduce the packet flooding can be achieved in the embodiment illustrated in FIG. 5 similar to the embodiment illustrated in FIG. 2.

Figure 6:
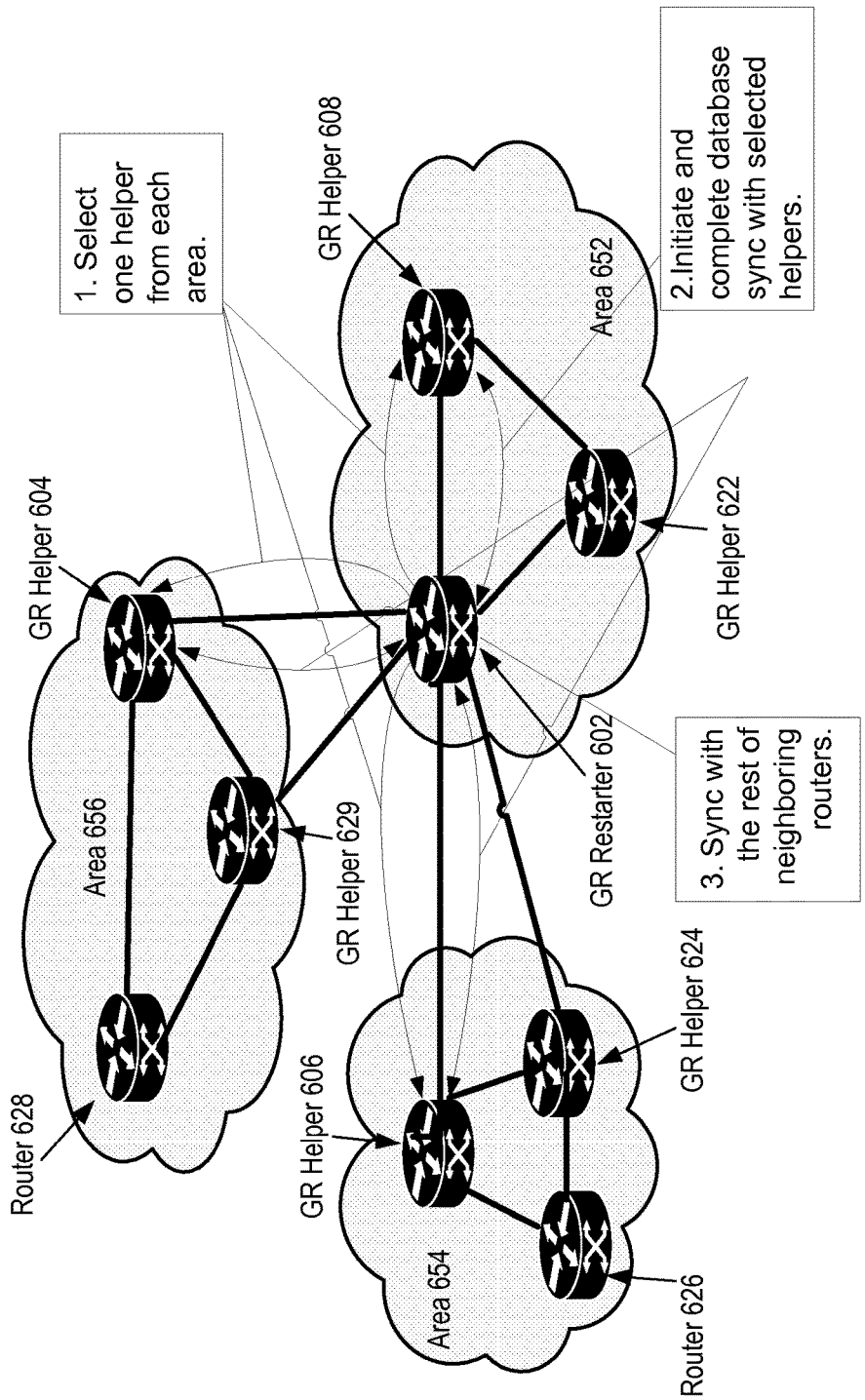
FIG. 6 is a block diagram illustrating an enhanced GR process in a network with multiple areas according to one embodiment of the invention.

FIG. 6 is a block diagram illustrating an enhanced graceful restart (GR) process in a network with multiple areas according to one embodiment of the invention. Referring to FIG. 6, the network 600 contains areas 652, 654, and 656. Area 652 contains router GR restarter 602, which is the router configured to start a GR session. The neighboring routers of GR restarter 602 can be a helper of a GR session, and they are GR helper 606 and GR helper 624 of area 654, GR helper 629 and GR helper 604 of area 656, and GR helper 608 and GR helper 622 of area 652. Router 626 in area 654 and router 628 in area 656 are in an area different from GR restarter 602, and they may be invisible to GR restarter 602.

The enhanced GR process starts at task box 1, where GR restarter 602 selects one helper router in each area to start. GR restarter 602 selects GR helper 604 in area 656, GR helper 606 in area 654, and GR helper 608 in area 652. The selection may be based on the timing of receiving a "Hello" message from neighboring routers within an area. In one embodiment, GR restarter 602 selects the GR helper whose "Hello" message is received first among all GR helpers within the area. At task box 2, GR restarter 602 initiates and then completes database synchronizations with the selected GR helpers within each area. The database synchronization processes may be performed following the same process discussed herein above in relating to FIG. 2. Only after database synchronizations complete, at task box 3, GR restarter 602 initiates database synchronizations with the remaining neighboring routers. In FIG. 6, GR restarter 602 will initiate database synchronizations with GR helper 624 in area 654 and with GR helper 629 in area 656 after receiving a "Hello" message from GR helpers 624 and 629. After GR restarter 602 completes database synchronization with all neighboring routers, the GR session completes successfully.

Figure 7:
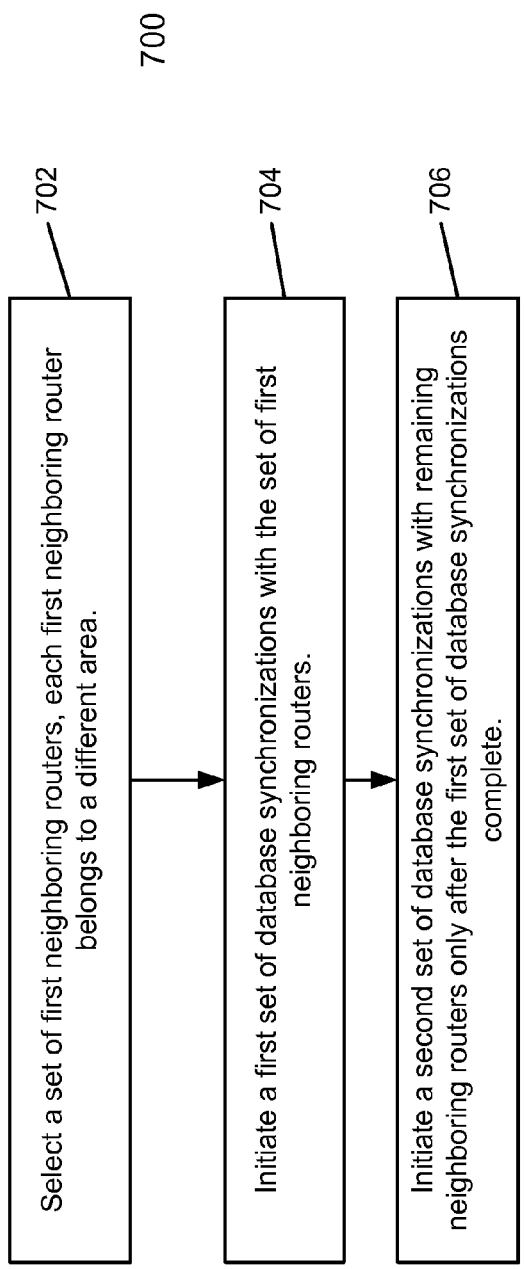
FIG. 7 is a flow diagram illustrating an enhanced GR process in a network with multiple areas according to one embodiment of the invention.

FIG. 7 is a flow diagram illustrating an enhanced graceful restart (GR) process in a network with multiple areas according to one embodiment of the invention. The process can be implemented on an OSPF enabled router such as GR restarter 602 in FIG. 6. The process starts at reference 702, where an OSPF enabled router starts a GR session (thus the OSPF enabled router is a "GR restarter"), and it selects a first neighboring router from a plurality of neighboring routers, each selected neighboring router belongs to a different area. The selection may be based on the timing of receiving a "Hello" message back from a neighboring router within a given area. In one embodiment, the GR restarter selects the GR helper within a given area whose "Hello" message is received first after the GR restarter initiates a database synchronization process. In another embodiment, GR restarter may select a GR helper within a given area for the database exchange process using a different criterion. For example, the GR restarter may select a GR helper whose "Hello" message is received in a predetermined time and whose router ID in is the lowest or the highest number within the given area.

After the GR helpers are selected from each area, the GR restarter initiates a first set of database synchronizations with the selected neighboring routers (i.e., GR helpers) at reference 704. The database synchronizations proceed along until they are complete. Only after the first set of database synchronizations complete, the GR restarter initiates a second set of database synchronizations with the remaining neighboring routers at reference 706.

As used herein, a network element (e.g., a router, switch, bridge, load balancer) is a piece of networking equipment, including hardware and software that communicatively interconnects other equipment on the network (e.g., other network elements, end systems). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network elements, which are coupled (e.g., through one or more core network elements) to other edge network elements, which are coupled to other end systems (e.g., server end systems).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics. Note that embodiments of this invention apply where the control plane and data plane are in separate network elements. In other words, a network element that enables OSPF routing in embodiments of this invention may complete control plane functionalities while another network element complete data plane functionalities.

Figure 8:
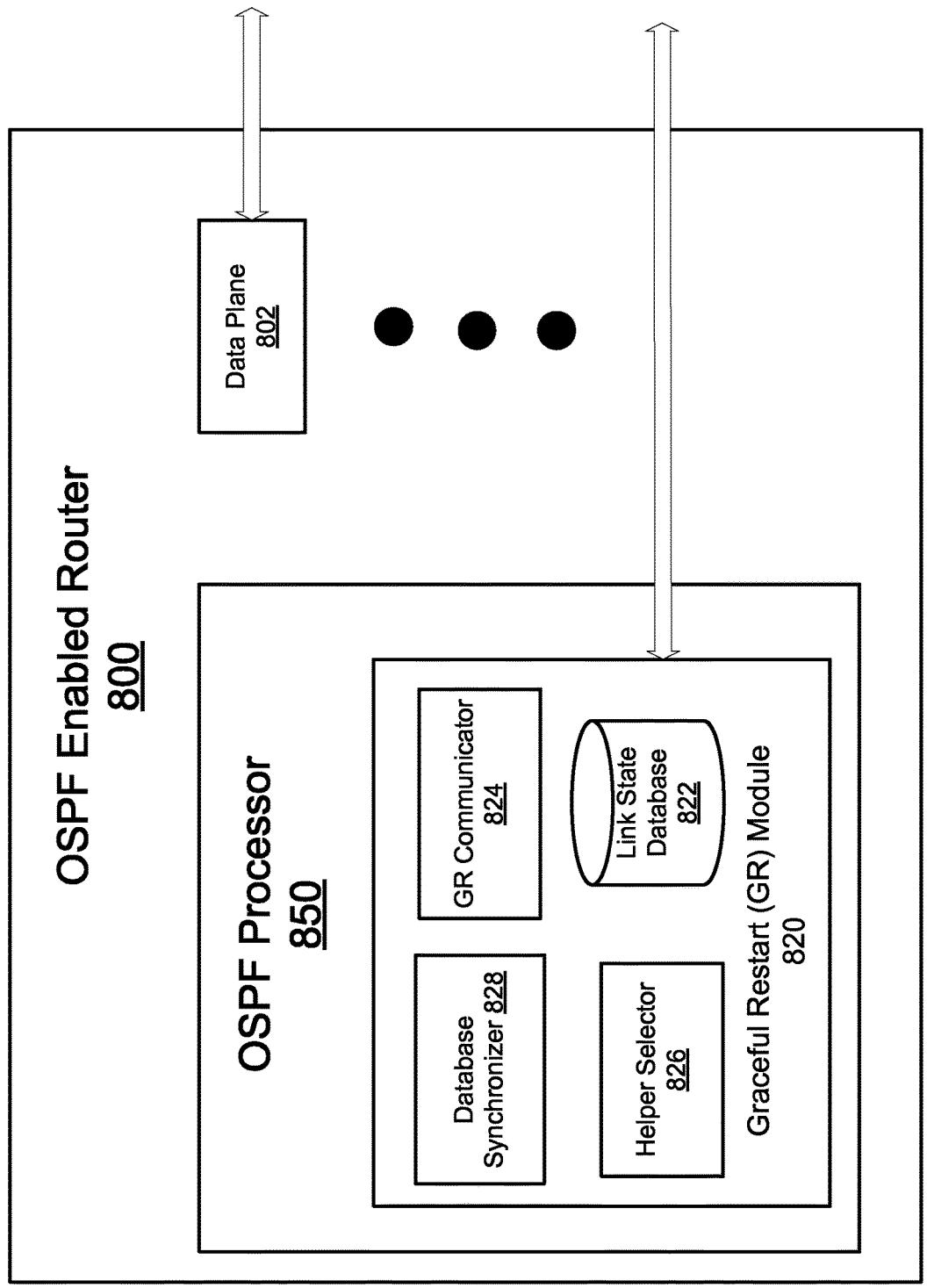
FIG. 8 is a block diagram illustrating one embodiment of a network element serving as an OSPF enabled router according to one embodiment of the invention.

FIG. 8 is a block diagram illustrating one embodiment of a network element serving as an OSPF enabled router according to one embodiment of the invention. In one embodiment, OSPF enabled router 800 contains both data plane 802 and a control plane that includes OSPF processor 850. OSPF processor 850 may be implemented in hardware and software. Data plane 802 interacts with data packet processing through network element 800, while OSPF processor 850 manages OSPF routing. In some embodiments, data plane 802 may be implemented on a line card and OSPF processor 850 may be implemented on a control card of OSPF enabled router 800. Data plane 802 and OSPF processor 850 may also be integrated as a single unit of OSPF enabled router 800. OSPF processor 850 may be implemented by general purpose or special purpose processors. OSPF processor 850 contains a GR communicator 824 configured to communicate with neighboring routers during a GR session, database synchronizer 828 configured to synchronize database with neighboring routers, helper selector 826 configured to select one or more neighboring routers for database synchronizations, and link state database 822 configured to store link state information for OSPF enabled router 800. The individual modules in network processor 850 can contain their dedicated network process units (NPU) or they can share NPUs among multiple modules. Note multiple modules or all modules within OSPF module 850 may be integrated to one or more modules to execute an enhanced OSPF graceful restart process.

In one embodiment, OSPF enabled router 800 initiates a GR session by sending out a grace-LSA packet. The grace-LSA packet may be generated and sent out to neighboring routers by GR communicator 824. In another embodiment, GR communicator 824 may generate and send out a "Hello" message with option indicating a request of starting a GR session. OSPF processor 850 then monitors packets received from neighboring routers. Helper selector 826 may be configured to select a neighboring router to initiate a first database synchronization based on "Hello" messages received through GR communicator 824. When OSPF enabled router 800 operates in a network with multiple areas, helper selector 826 may be configured to select a set of neighboring routers to initiate a first set of database synchronizations. In which case, helper selector 826 may select one neighboring router from each area. After helper selector 826 selects one or a set of neighboring routers, database synchronizer 828 may be configured to initiate database synchronizations between OSPF enabled router 800 and the selected one or the set of neighboring routers.

During the data synchronizations between OSPF enabled router 800 and the selected one or the set of neighboring routers, OSPF enabled router 800 continues receiving "Hello" messages from neighboring routers. In one embodiment, OSPF enabled router 800 ignores the receiving "Hello" messages. In another embodiment, OSPF enabled router 800 may send out message indicating first data synchronization or a set of first data synchronizations is ongoing through GR communicator 824 so that neighboring routers no longer sends out "Hello" messages or sending out "Hello" messages less frequently. Once the first data synchronization or the set of first data synchronizations completes, database synchronizer 828 may initiate database synchronization with remaining neighboring routers concurrently. At which time, since link state database 822 should already contain up-to-date link state information, the data synchronizations following the first data synchronization or the set of first data synchronizations contains much less packet and the GR session should complete with less time and less network work resources than an GR session known to persons skilled in the art.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented on an Open Shortest Path First (OSPF) enabled router that is adjacent to a plurality of neighboring OSPF enabled routers within a network, wherein the OSPF enabled router and the plurality of neighboring OSPF enabled routers are within one area, wherein the OSPF enabled router and the plurality of neighboring OSPF enabled routers support an implementation of a graceful restart (GR) protocol, the method comprising:

in preparation of a database synchronization process of the OSPF enabled router during a GR session, wherein the OSPF enabled router is a GR restarting router, selecting a first neighboring OSPF enabled router from the plurality of neighboring OSPF enabled routers, wherein the first neighboring OSPF enabled router is a single router selected from the plurality of neighboring OSPF enabled routers;

initiating a first database synchronization with the first neighboring OSPF enabled router; and initiating a set of database synchronizations with remaining neighboring OSPF enabled routers only after the first database synchronization with the first neighboring OSPF enabled router completes, wherein each of the set of database synchronizations includes exchanging one or more database description packets.

2. The method of claim 1, wherein selecting the first neighboring OSPF enabled router is based on receiving a first "Hello" message from the first neighboring OSPF enabled router.

3. The method of claim 1, wherein initiating one of the set of database synchronizations with one of the remaining neighboring OSPF enabled routers is based on receiving a second "Hello" message from the one of the remaining neighboring OSPF enabled routers after the first database synchronization with the first neighboring OSPF enabled router completes.

4. The method of claim 1, wherein the first database synchronization and the set of database synchronizations are performed through exchanging database description (DD) packets, Link State Request (LSR) packets, and Link State Update (LSU) packets between the OSPF enabled router and the plurality of neighboring OSPF enabled routers.

5. The method of claim 1, wherein starting of the database a synchronization process during the GR session is initiated by the OSPF enabled router sending out a grace Link State Advertisement (LSA) message.

6. The method of claim 1, wherein starting of the database synchronization process during the GR session is initiated by the OSPF enabled router sending out a third "Hello" message including information indicating an out-of-band database synchronization being enabled.

7. The method of claim 1, wherein a second "Hello" message from one of the remaining neighboring OSPF enabled routers is ignored by the OSPF enabled router prior to the first database synchronization with the first neighboring OSPF enabled router completes.

8. A network element serving as an Open Shortest Path First (OSPF) enabled router that is adjacent to a plurality of neighboring OSPF enabled routers within a network, wherein the OSPF enabled router and the plurality of neighboring OSPF enabled routers support an implantation of a graceful restart (GR) protocol, the network element comprising:
   a processor;
   a non-transitory computer readable storage medium storing instructions which, when executed by the processor, cause the network elements to:
      communicate with neighboring OSPF enabled routers;
      select a first neighboring OSPF enabled router from the plurality of neighboring OSPF enabled routers in preparation of a database synchronization process during a GR session, wherein the first neighboring OSPF enabled router is a single router selected from the plurality of neighboring OSPF enabled routers; and
      initiate a first database synchronization with the first neighboring OSPF enabled router; and
      initiate a set of database synchronizations with remaining neighboring OSPF enabled routers only after the first database synchronization with the first neighboring OSPF enabled router completes, wherein each of the set of database synchronizations includes exchanging one or more database description packets.

9. The network element of claim 8, wherein selecting the first neighboring OSPF enabled router is based on receiving a first "Hello" message from the first neighboring OSPF enabled router.

10. The network element of claim 8, wherein initiating one of the set of database synchronizations with one of the remaining neighboring OSPF enabled routers is based on receiving a second "Hello" message from the one of the remaining neighboring OSPF enabled routers after the first database synchronization with the first neighboring OSPF enabled router completes.

11. The network element of claim 8, wherein the first database synchronization and the set of database synchronizations are performed through exchanging database description (DD) packets, Link State Request (LSR) packets, and link State Update (LSU) packets between the network element and the plurality of neighboring OSPF enabled routers.

12. The network element of claim 8, wherein starting of the database synchronization process during the GR session is initiated by the OSPF enabled router sending out a grace Link State Advertisement (LSA) message.

13. The network element of claim 8, wherein starting of the database synchronization process during the GR session is initiated by the network element sending out a third "Hello" message including information indicating out-of-band database synchronization being enabled.

14. The network element of claim 8, wherein a second "Hello" message from one of the remaining neighboring OSPF enabled routers is ignored by the network element prior to the first database synchronization with the first neighboring OSPF enabled router completes.

15. A method implemented on an Open Shortest Path First (OSPF) enabled router, the router being adjacent to a plurality of neighboring OSPF enabled routers within a network, wherein the OSPF enabled router and the plurality of neighboring OSPF enabled routers in the network support a graceful restart (GR) protocol, and wherein the plurality of neighboring OSPF routers belongs to a plurality of areas of the network, the method comprising:
   in preparation of a database synchronization process of the OSPF enabled router during a GR session, wherein the OSPF enabled router is a GR restarting router,
   selecting a first set of neighboring OSPF enabled routers from the plurality of neighboring OSPF enabled routers, wherein each of the first set of neighboring OSPF enabled routers is a single OSPF enabled router belonging to a different area;
   initiating a first set of database synchronization with each of the first set of neighboring OSPF enabled routers; and
   initiating a second set of database synchronizations with remaining neighboring OSPF enabled routers only after the first set of database synchronization with the first set of neighboring OSPF enabled routers completes, wherein each of the set of database synchronizations includes exchanging one or more database description packets.

16. The method of claim 15, wherein selecting each of the first set of neighboring OSPF enabled routers is based on receiving a first "Hello" message from the each of the first set of neighboring OSPF enabled routers and before other neighboring OSPF enabled routers within the same area of the each of the first set of neighboring OSPF enabled routers.

17. The method of claim 15, wherein starting of the database synchronization process during the GR session is initiated by the OSPF enabled router sending out a grace Link State Advertisement (LSA) message.

18. The method of claim 15, wherein starting of the database synchronization process during the GR session is initiated by the OSPF enabled router sending out a second "Hello" message including information indicating an out-of-band database synchronization being enabled.

* * * * *